United States Patent
Iverson et al.

(10) Patent No.: US 7,169,423 B2
(45) Date of Patent: Jan. 30, 2007

(54) COATING COMPOSITION FOR FOOD PRODUCTS

(75) Inventors: Carl E. Iverson, 507 Pear St. NE., Olympia, WA (US) 98506; Scott P. Ager, Tumwater, WA (US)

(73) Assignee: Carl E. Iverson, Olympia, WA (US)

( * ) Notice: Subject to any disclaimer, the term of this patent is extended or adjusted under 35 U.S.C. 154(b) by 358 days.

(21) Appl. No.: 10/437,718

(22) Filed: May 12, 2003

(65) Prior Publication Data

US 2003/0203084 A1    Oct. 30, 2003

Related U.S. Application Data

(62) Division of application No. 09/615,586, filed on Jul. 13, 2000, now Pat. No. 6,586,029.

(60) Provisional application No. 60/202,666, filed on May 8, 2000, provisional application No. 60/169,773, filed on Dec. 9, 1999, provisional application No. 60/143,606, filed on Jul. 13, 1999.

(51) Int. Cl.
*A23B 7/16* (2006.01)

(52) U.S. Cl. ............... 426/310; 426/309; 426/658; 106/162.2

(58) Field of Classification Search ........... 426/310, 426/309, 658; 106/162.2
See application file for complete search history.

(56) References Cited

U.S. PATENT DOCUMENTS 2,040,880 A * 5/1936 Rigby ..................... 536/20
5,077,052 A * 12/1991 Franzoni et al. ........... 424/438
5,283,064 A * 2/1994 Suzuki et al. ............ 424/451
5,554,445 A * 9/1996 Struszczyk et al. ........ 428/403
5,762,992 A * 6/1998 Takeuchi et al. .......... 426/548
6,197,942 B1 * 3/2001 Muraki ..................... 536/20

OTHER PUBLICATIONS

Kim et al., "The effect of low molecular weight chitosans on the characteristics of kimchi during fermentation". Korean J. Foods & Nutrit., 27(3): 420-427, Mar. 1995.*

* cited by examiner

*Primary Examiner*—Keith Hendricks
*Assistant Examiner*—Kelly Mahafkey
(74) *Attorney, Agent, or Firm*—Delbert J. Barnard

(57) ABSTRACT

A virgin chitosan polymer is added to an acid and water solution in an amount sufficient to form an edible composition having a solids content greater than five percent (5%) and a liquid viscosity. The composition is applied to food products, such as fruits, vegetables and nuts, to provide an edible protective coating for the food products. Alternatively, chitosan may be hydrolyzed to a lower molecular weight so that a gel will not be formed when the partially hydrolyzed chitosan is admixed to the acid water solution. An edible wax emulsion and/or a preservative such as sodium benzoate, and/or an adhesion additive such as zinc acetate, and/or a wetting agent, and/or one or more additives from the group consisting of virgin and/or modified carbohydrates, proteins, hydrocolloides, lipids, oils, gums and waxes, natural and/or synthetic, made be added to the composition before it is applied to the food product. In a preferred form, a chitosan polymer is used that has a molecular weight sufficient to form a composition having a solids content of about fifteen percent (15%) or higher.

3 Claims, 2 Drawing Sheets

COATING COMPOSITION FOR FOOD PRODUCTS

RELATED APPLICATIONS

This application is a Divisional of Ser. No. 09/615,586 filed Jul. 13, 2000 U.S. Pat. No. 6,586,029 which claims benefit to provisional application Ser. No. 60/143,606, filed Jul. 13, 1999, to provisional application Ser. No. 60/169/773, filed Dec. 9, 1999, and to provisional application Ser. No. 60/202,666 filed May 8, 2000.

TECHNICAL FIELD

This invention relates to protective coatings for food products. More particularly, it relates to a method of preparing and using a protective coating for food products such as fruits, vegetables and nuts, based on chitosan or chitosan derivatives, and to the coating composition itself.

BACKGROUND OF THE INVENTION

It is well known to coat food products, such as fruits, vegetables and nuts, to protect them against mold, rot and water damage and to improve their appearance and, hence, their marketability. Common coatings now in use employ proteins, gums, resins, hydrocolloids, waxes, and oils either alone or in combination, to achieve certain desired objectives. Enhancing appearance, slowing moisture loss, affecting the respiration or ripening process of fruits, nuts, and vegetables, are several of the goals of many modern food coatings.

Coating fruit, first with a sorbate and then with a wax, is disclosed by U.S. Pat. No. 4,434,184, granted Feb. 28, 1984 to Paul M. Nelson.

Coating food products with a shellac based coating is disclosed by U.S. Pat. No. 4,810,434, granted Mar. 7, 1989, to Jonathan Seaborne and David C. Igberg.

U.S. Pat. No. 5,554,445, granted Sep. 10, 1996, to Henryk Struszczyk and Olli Kivekäs, discloses encapsulation of seeds by a film of microcrystalline chitosan.

U.S. Pat. No. 5,283,064, granted Feb. 1, 1994, to Tsutomu Suzuki; Kenichi Hashiudo; Takayuki Matsumoto; Toshihiro Higashide and Takeru Fujii discloses making a capsule that is composed of chitosan; U.S. Pat. No. 2,040,880, granted May 19, 1936, to George W. Rigby, discloses making a then film product from deacetylated chitin. U.S. Pat. Nos. 2,040,880, 5,283,064, and 5,554,445 are non-analogize art to the subject invention.

An object of the present invention is to provide a new and improved coating and a method of preparing and using the coating.

Another object of the present invention is to provide a coating composition that is easy to manufacture and apply.

The present invention utilizes a typical properties of chitosan (at biological pH values, chitosan is positively charged) to provide an improved coating film for food products, such as fruits, vegetables and nuts that is easy to apply.

BRIEF SUMMARY OF THE INVENTION

The protective coatings of the present invention are edible and are for use with fruits, vegetables, and nuts. It is made by admixing a chitosan polymer to an acid and water solution in an amount and molecular weight sufficient to form an edible composition having a solid content greater than 5% and a liquid viscosity. The composition is applied to a food product to provide an edible protective coating for the food product.

According to one aspect of the invention, a chitosan preparation is formed from a partially hydrolyzed virgin chitosan to lower the molecular weight of the polymer. The chitosan polymer is hydrolyzed to a molecular weight low enough that a gel will not be formed when it is admixed to the acid and water solution. Acetic acid is particularly suitable for making the acid and water solution.

According to another aspect of the invention, a nonionic carnauba wax emulsion is added to the composition before the composition is applied to the food product. Preferably, a chitosan polymer is used having a molecular weight sufficient to form a composition with the acid and water solution in which the solids content is about 15% or higher.

Additional additives to the composition may include, but are not limited to a preservative, e.g. sodium benzoate, in an amount sufficient to extend the useful working life of the composition; and additive, e.g. zinc acetate, for enhancing adhesion of the protective coating to the food product; a wetting agent; and additives that improve physical characteristics of the protective coating, including proteins, carbohydrates, other hydrocolloids, resins, gums, oils, natural or synthetic waxes and/or lipids. These additives may be used alone or in combination.

The present invention provides an alternative to existing and conventional coatings for food products such as fruits, vegetables and nuts. The invention includes producing a high solids solution of water, acetic acid (or other acid), and a selectively engineered molecular weight range of chitosan or chitosan derivatives. This solution may be used by itself, as the coating, or some other coating enhancers can be added to and made apart of the solution before it is used. The solution is applied to food products such as fruit, vegetables or nuts by use of conventional equipment and coating techniques. The solution is applied and then the food product is dried, also by use of conventional equipment and techniques.

The invention includes providing a protective coating for fruits, vegetables and nuts that is basically characterized by an acetic acid water solution to which chitosan or selected hydrolysates of chitosan have been admixed in an amount sufficient to produce an edible coating that protects the food product from water loss or water damage, increases shelf life, improves the appearance of the product, and protects the product, all resulting in improved marketability of the product.

Chitosan is partially or completely deacetylated chitin. According to one aspect of the invention, the preferred chitosan polymer is of a molecular weight range that results in the formation of a lower viscosity liquid as opposed to a gel when unmodified chitosan is admixed with a water acid solution. According to the invention, in the manufacture of the chitosan from the chitin, the chitosan is hydrolyzed chemically or any other way that is currently know or is yet to be developed, to lower the molecular weight of the polymer.

The invention further includes preparing a solution of water, acetic acid (or other acid) and chitosan or chitosan derivatives, alone or with other additives and then either dipping the food product in this solution, or by brushing or spraying the solution on the food product, to form the protective coating.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and.

DETAILED DESCRIPTION OF THE INVENTION

The coating composition of the present invention includes "chitosan", a derivative of "chitin." Chitin (pronounced kite-in) is a natural fiber extracted from the shells of crustaceans such as shrimp, crab and lobster. Chitosan is the most common derivative of Chitin. To prepare chitin, the ground shellfish exoskeletons are decalcified with dilute acid, deproteinated with dilute alkali and the resulting material is bleached or decolorized. By treating the chitin with hot concentrated alkali, some or all of the N-acetyl groups may be removed resulting in a modified carbohydrate, polyglucosamine or chitosan. It is a non-toxic, biocompatible and biodegradable natural polymer. It is a member of a class of biopolymers called hydrocolloids, but has a typical properties. While most hydrocolloids are neutral or negatively charged at biological pH values, chitosan is positively charged. Its cationic nature in acid solution is ideal, as the positively charged chitosan is attracted to negatively charged surfaces. This bioadhesive capacity has made chitosan ideal for use as a protective coating for food products.

Figure 1:
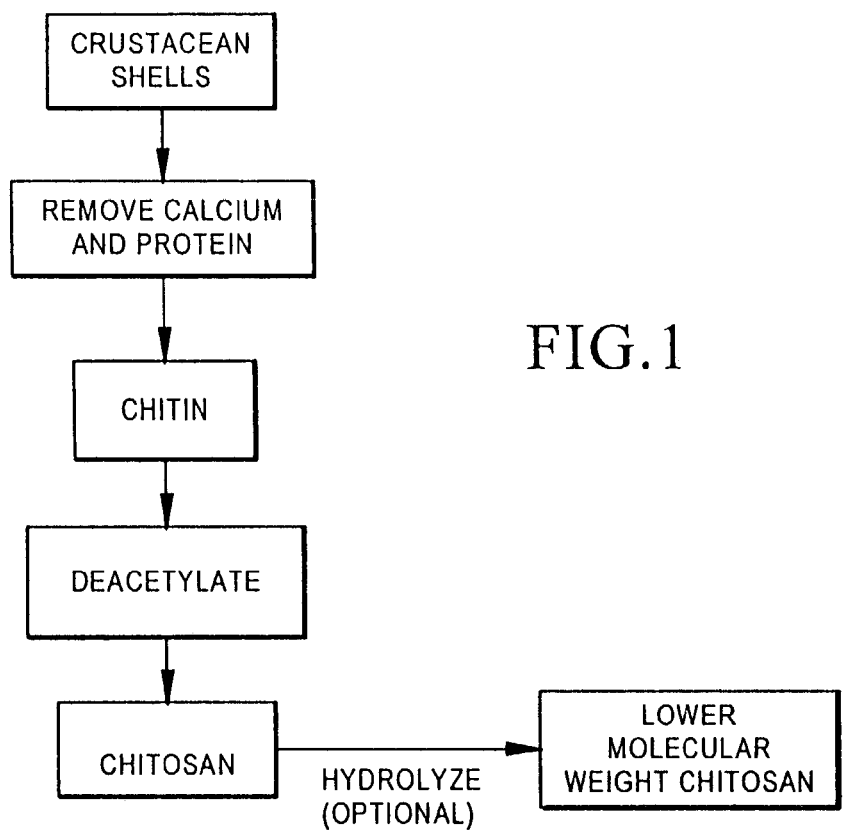
FIG. 1 is a flow diagram showing the steps for making the preferred chitosan polymer that is used in making the coating of the present invention.

Referring to FIG. 1, in accordance with the present invention, chitosan polymer may be hydrolyzed to a lower molecular weight. The chitosan polymer may be cut to a molecular weight low enough that the coating solution derived from it will not form a gel at the preferred solids content. In order to achieve a functional coating that provides both protection and enhancement of appearance, sufficient solids content (usually 15% or higher) and low solution viscosity must be achieved. Conventional chitosan solutions, in the past, have been shown to be far too viscous to apply when solids content approached even 3%.

Figure 2:
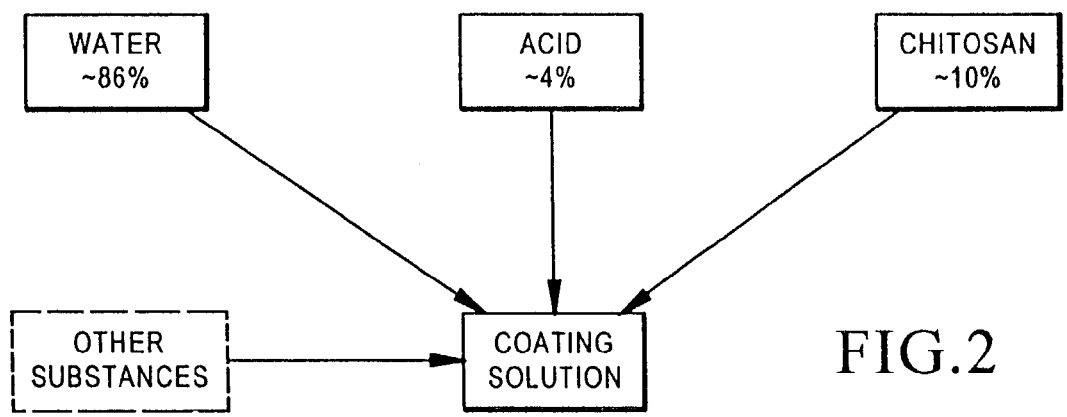
FIG. 2 is a flow diagram of a method of making the liquid coating from water, acid and the preferred chitosan polymer; and the subsequent addition of various enhancement substances and preservatives.

Referring now to FIG. 2, water, acetic acid (or other acid), and the preferred chitosan are mixed together to form a liquid solution that by itself, or with other additives, can serve as a beneficial coating for the food products. By way of typical example, the solution may consist of about eighty six percent (86%) water, about for percent (4%) acetic acid (or other acid) and about ten percent (10%) by weight of chitosan. The acid is admixed to the water and the preferred chitosan is admixed to the acid and water solution. The resulting solution functions as a high solids coating. The amount of chitosan can vary but the total solution solids must be in an amount sufficient to result in a coating that is very effective when applied to the food product.

Figure 3:
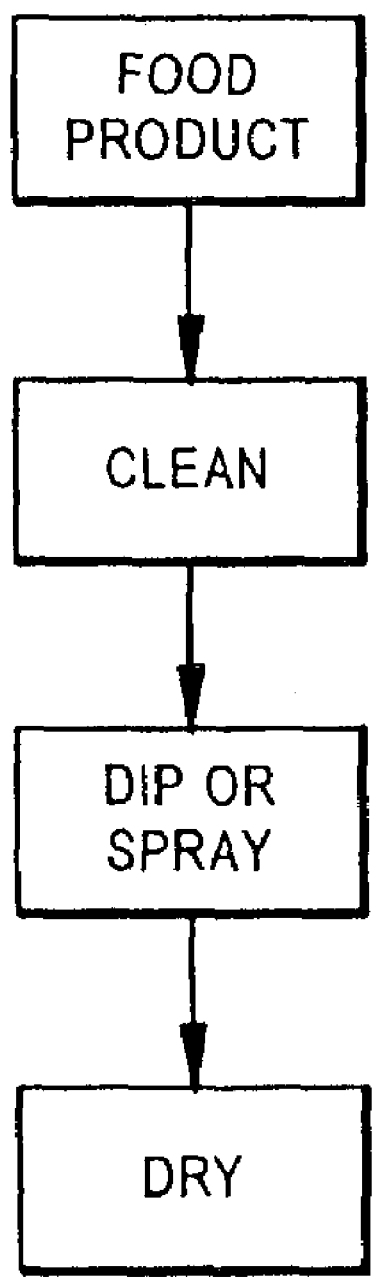
FIG. 3 is a flow diagram of a method of applying the chitosan coating to a food product, to produce a coating food product.

Referring to FIG. 3, according to the invention, the food product is harvested and then cleaned, such as by washing. Then, the coating is applied to the cleaned food product. This can be done by dipping the food product in a bath of the preferred chitosan/acid/water solution (with or without other additives). Or, the solution may be sprayed or brushed on the food product. If spraying is used, the cleaned food product may be placed on a conveyor and the coating solution may be sprayed on the food product while the food product remains on the conveyor.

As shown by FIG. 3, after the coating has been applied to the food product, the coated food product is dried. This may be done by subjecting the food product to a current of air, usually heated, for a time sufficient to make the surface of the food product dry to the touch. As the acetic acid evaporates along the water, the coating is rendered water insoluble.

It may be desirable to enhance the properties of the solution as a coating by adding other additives to the solution before it is applied to the food product. An example is a nonionic carnauba wax emulsion, which increases the coating adhesion to waxy or oily surfaces and retards moisture loss from the coated food item during storage.

The chitosan and the water and acid can be mixed to form the coating solution. The solution can be applied to the food products by dipping, spraying, or brushing. All of these steps in manufacturing and applying the coating are quite easy to perform.

The coating composition of the present invention provides a very effective protective layer on the outside of the food products. And, it provides an attractive high gloss shine.

Herein, a "high solids solution" means a solution having greater than five percent (>5%) solids. The use of a high solids solution provides a thick protective film on the food product Evaporation of the volatile acid leaves a water-resistant film upon drying. The particular chitosan that is used is manufactured to provide a high solids, low viscosity solution. It is the thick nature of the dried film that gives the food product a decorative, glossy coating. The thick films also slow moisture loss from the food product. These characteristics of a glossy, decorative appearance and a thick protective film can be enhanced by use of additives to the water/acid/chitosan solution.

Because of the presence of primary amino groups in the chitosan polymer, it is strongly cationic and will only dissolve in water after neutralization with dilute mineral or organic acids. By using a volatile acid, such as acetic acid, a solution of chitosan can be prepared in water and applied to a surface so that the resulting film formed after drying will be water insoluble.

The rendering of a water insoluble film or coating from an aqueous solution of other edible materials is known in the fruit and vegetable industry. An example of this is the use of aqueous solutions of shellac neutralized with a volatile amine, such as morpholine, to provide protective, water insoluble and glossy coatings to the agricultural product. In this particular case, the chemistry is reversed wherein a volatile acid is used to neutralize an amino carbohydrate polymer to render it water-soluble until the time of application.

EXAMPLE 1

Untreated chitosan was admixed with water and acetic acid to form a solution containing, by weight, 86% water, 4% acetic acid and 10% chitosan. The solution was heated and stirred until mixing was complete. Then, sodium benzoate, in the amount of 0.25% by weight, was added to the solution to act as a preservative. The resultant solution was applied by hand brushing to apples, pears, lemons, oranges and walnuts. The brushing was followed by forced air drying of the coated food items at 120 degrees F. for two minutes.

The resulting films on the walnuts and the pears visually enhanced the appearance of these items. There was a lack of good adhesion of the chitosan films to the apples, lemons and oranges. It was concluded that the solution was too viscous to use with some commercial application equipment. Also, it was decided that subsequent preparations should be tested only on apples as they provided the most difficult substrate for the evaluation of coating qualities.

EXAMPLE 2

The steps of Example 1 were repeated with the exception that a hydrolyzed form of chitosan was used to prepare an 18% solids solution. The results were the same as the results obtained with the use of the untreated chitosan that was used in Example 1. However, the viscosity of the solution was lower to such an extent that it could be applied with all known commercial application equipment and methods.

EXAMPLE 3

Seven volumes of carnauba wax emulsion containing sixteen percent total solids was added to three volumes of the Example 1 solution containing 10% chitosan solids. The resultant mixture was applied by hand brushing to apples followed by forced air drying at one hundred twenty Fahrenheit (120° F.) for two minutes. The resultant film was glossy and visually enhanced the gloss and appearance of the apples. The addition of the wax emulsion also physically enhanced adhesion of the film to the surface of the fruit and improved the water resistance of the dried coating. The wax emulsion also added plasticity to the coating. It was concluded, however, that using unmodified chitosan in the preparation resulted in a product that was still too viscous to be applied with some commercial equipment.

EXAMPLE 4

The steps of Example 3 were repeated with the exception that a hydrolyzed form of chitosan was used. The results were the same as those observed with the Example 3 coating. However, the viscosity of the solution was lowered, enabling it to be applied by all commercial equipment and processes.

The carnauba wax emulsion that was used in Examples 3 and 4 was a proprietary product known as Emulsion No. 93016. It is made by Michelman, Inc. of 9080 Shell Road, Cincinnati, Ohio 45236. It was concluded, however, that other wax emulsions could be used.

EXAMPLE 5

Example 1 was repeated but 0.25% by weight of zinc acetate was applied to the solution. This enhanced the adhesion of the chitosan film to the surfaces of the coated food items in many cases. The solution still proved to be too viscous to apply using some commercial application equipment and processes.

EXAMPLE 6

The 0.25% by weight of zinc acetate was added to the Example 2 solution. Adhesion of the chitosan film to the surfaces of the food items was enhanced in many cases. The viscosity of the solution appeared to be low enough to allow the use of all commercial equipment and processes for applying the solution to the food products.

EXAMPLE 7

A solution was prepared in accordance with Example 1 and 1.5 volumes of a 20% solids aqueous solution of modified food starch was added to the solution. This modified food starch is manufactured by National Starch and Chemical of Bridgewater, N.J. and is referred to as "Crystal Gum 59". The resultant coating film showed excellent gloss on all of the food items. However, the use of the unmodified chitosan resulted in a solution that was too viscous to be practical for some commercial application equipment.

EXAMPLE 8

Example 7 was repeated but this time a hydrolyzed form of chitosan was used. The results were the same except that the viscosity was low enough to make the formalization practical for all commercial application equipment.

EXAMPLE 9

Example 1 solution was prepared and 1% by weight of Polysorbate 60, a food emulsifier, was added. This additive improved both adhesion and flexibility of the film. However, the solution again proved to be too viscous to be practical for some commercial application equipment.

EXAMPLE 10

Example 9 was repeated accept that a hydrolyzed form of chitosan was used. Improved adhesion and flexibility was obtained and the viscosity was low enough to make the solution practical for all commercial application equipment.

EXAMPLE 11

A food emulsifier used in Examples 9 and 10 was added to the Example 7 solution. Adhesion and flexibility was improved but the viscosity was too high to be useful for some commercial application equipment.

EXAMPLE 12

Example 11 was repeated but a hydrolyzed form of chitosan was used. There was improved adhesion and flexibility of the film and the viscosity was low enough to make the solution practical for all commercial application equipment.

EXAMPLE 13

A solution was prepared in accordance with Example 1 and 1.5 volumes of a 20% solids aqueous solution of commercially available modified gelatin. The resultant coating film showed excellent gloss on all of the food items. However, the use of the unmodified chitosan resulted in a solution that was too viscous to be practical for some commercial application equipment.

EXAMPLE 14

Example 13 was repeated but this time a hydrolyzed form of chitosan was used. The results were the same except that the viscosity was low enough to make the preparation practical for all commercial application equipment.

It was concluded from the tests that were conducted that a chitosan polymer should be used that has a solids content greater than five percent (5%) and a viscosity that can best be described as a liquid viscosity. The chitosan preferably may be partially hydrolyzed to lower the molecular weight of the polymer to reduce viscosity of the final preparation. The solution resulting from the admixing of the chitosan polymer to the acid and water, with any or all desired additives, should have a solids content of about fifteen percent (15%) or higher for best results.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. An edible protective coating for food products comprising a chitosan polymer in an acid and water solution in an amount and molecular weight sufficient to form an edible coating composition having a solids content greater than 5% and a liquid viscosity, said protective coating further including an nonionic carnauba wax emulsion.

2. An edible protective coating for food products comprising a chitosan polymer in an acid and water solution in an amount and molecular weight sufficient to form an edible coating composition having a solids content greater than 5% and a liquid viscosity, said protective coating comprising a preservative in an amount sufficient to extend the useful working life of the coating composition, wherein the preservative comprises sodium benzoate.

3. An edible protective coating for food products comprising a chitosan polymer in an acid and water solution in an amount and molecular weight sufficient to form an edible coating composition having a solids content greater than 5% and a liquid viscosity, said protective further comprising an additive that enhances adhesion of the protective coating on the food product, wherein the additive for enhancing adhesion is zinc acetate.

* * * * *